(12) United States Patent
Mrozinski (10) Patent No.: US 10,563,968 B2
(45) Date of Patent: Feb. 18, 2020

(54) TAPE MEASURE AND RECORDER DEVICE

(71) Applicant: Richard Mrozinski, Slidell, LA (US)

(72) Inventor: Richard Mrozinski, Slidell, LA (US)

(*) Notice: Subject to any disclaimer, the term of this patent is extended or adjusted under 35 U.S.C. 154(b) by 145 days.

(21) Appl. No.: 15/838,221

(22) Filed: Dec. 11, 2017

(65) Prior Publication Data
US 2018/0164087 A1    Jun. 14, 2018

Related U.S. Application Data

(60) Provisional application No. 62/432,489, filed on Dec. 9, 2016.

(51) Int. Cl.
| | | |
|---|---|---|
| *G01B 3/10* | (2006.01) | |
| *G01B 3/1061* | (2020.01) | |
| *G01S 17/08* | (2006.01) | |
| *G01B 3/1005* | (2020.01) | |
| *G01S 17/88* | (2006.01) | |
| *G01S 7/481* | (2006.01) | |

(52) U.S. Cl.
CPC ......... *G01B 3/1061* (2013.01); *G01B 3/1005* (2013.01); *G01S 7/4813* (2013.01); *G01S 17/08* (2013.01); *G01S 17/88* (2013.01); *G01B 2003/1046* (2013.01); *G01B 2003/1069* (2013.01); *G01B 2003/1092* (2013.01)

(58) Field of Classification Search
CPC ...................... G01B 3/1061; G01B 2003/1069
USPC ........................................... 33/759, 760, 761
See application file for complete search history.

(56) References Cited

U.S. PATENT DOCUMENTS

| | | | |
|---|---|---|---|
| 5,287,627 A * | 2/1994 | Rando | G01B 3/00 33/227 |
| 5,396,578 A | 3/1995 | Howes | |
| 6,928,029 B2 | 8/2005 | Rickman | |
| 7,293,366 B2 * | 11/2007 | Schulte | G01C 3/00 33/700 |
| 7,353,619 B2 * | 4/2008 | Gibbons | G01B 3/1084 33/227 |
| 7,456,936 B2 * | 11/2008 | Gogolla | G01C 15/002 356/4.01 |
| 8,356,419 B2 * | 1/2013 | Lord | G01B 3/11 33/756 |
| 2002/0011007 A1 * | 1/2002 | Byrd | G01C 3/10 33/760 |
| 2002/0088136 A1 | 7/2002 | Tseng | |
| 2008/0163504 A1 * | 7/2008 | Smith | G01C 17/30 33/268 |
| 2009/0307920 A1 | 12/2009 | Schrage | |
| 2014/0090264 A1 * | 4/2014 | Li | G01S 17/10 33/760 |
| 2014/0190025 A1 * | 7/2014 | Giger | G01C 15/002 33/228 |

* cited by examiner

*Primary Examiner* — George B Bennett
(74) *Attorney, Agent, or Firm* — Charles Runyan (57) ABSTRACT

An apparatus for measuring a distance from the apparatus to an object; the apparatus includes a housing, a retractable-tape, a laser-rangefinder, a controller, a digital-display, and a power supply. The apparatus is useful for providing an improved measuring apparatus for measuring the distance, and for recording a plurality of distances within the apparatus.

20 Claims, 6 Drawing Sheets

TAPE MEASURE AND RECORDER DEVICE

CROSS REFERENCE TO RELATED APPLICATION

The present application is related to and claims priority to U.S. Provisional Patent Application No. 62/432,489 filed Dec. 9, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of measuring apparatus and more specifically relates to a tape measure and measurement recording device.

2. Description of Related Art

A tape measure or measuring tape is a flexible ruler. It consists of a ribbon of cloth, plastic, fiberglass, or metal strip with linear-measurement markings. A tape measure may come in a casing that is spring loaded to allow for the tape to recoil, as well as a self-retracting tape measure. One of the principal drawbacks encountered by most individuals is the requirement that the individual must either manually or mentally make a record of the measurements being taken. In most instances, individuals must either carry pads of paper and a pen/pencil with them while employing the tape measuring device, such that the measurement being made can be properly recorded. Alternatively, the measurements are written on any available surface for later use by the individual.

There have been several tape measurers which have attempted to make measuring easier including voice recorders. The problem with a voice recorder is that when there is external noise such as saws and other sounds, it can be hard to hear when played back. Plus, the entire message has to be played back in order to hear one measurement. Thus, a suitable solution is desired.

U.S. Pat. No. 6,928,029 to Brandon Rickman relates to a combination tape measure and range finder. The described combination tape measure and range finder includes a housing with a retractable tape, a waveform range finder, and a laser pointer disposed within the housing. The retractable tape includes indicia corresponding to a distance. A save button is further disposed on the housing, wherein upon the depression of the save button, the distance measured by waveform range finder is saved to a memory. A display on the housing indicates the dimension measured by the waveform range finder.

BRIEF SUMMARY OF THE INVENTION

In view of the foregoing disadvantages inherent in the known measuring apparatus art, the present disclosure provides a novel tape measure and recorder device. The general purpose of the present disclosure, which will be described subsequently in greater detail, is to provide an improved measuring apparatus for measuring and recording measurements.

An apparatus for measuring a distance between the apparatus and an object is disclosed herein. The apparatus includes a housing which may include an outer-surface, an inner-volume, and a tape-opening. Further, a retractable-tape may be disposed within the inner-volume of the housing, the retractable-tape including a first-end, a second-end, and a length therebetween. The retractable-tape may be configured to selectively move between a retracted-position and an extended-position via the tape-opening of the housing. Further, the apparatus may include a laser-rangefinder located on the outer-surface of the housing, and may include a laser-beam configured to measure the distance from the apparatus to the object. The present invention provides measuring means.

A controller may be disposed within the inner-volume of the housing and may include a processor configured to record at least one measured distance from the apparatus to the object, and a memory configured to store the at least one measured distance from the apparatus to the object. In addition, the apparatus may include a digital-display located on the outer-surface of the housing and communicably coupled to the controller, the digital-display being configured to display the at least one measured distance from the apparatus to the object and a power-supply may be included and configured to provide power to the controller, the laser-rangefinder and the digital-display.

A method of using the apparatus is also disclosed herein. The method of using the apparatus may comprise the steps of: providing the apparatus as above; selectively moving the retractable-tape from the retracted-position to the extended-position; resting the second-end of the retractable-tape on the object; actuating the laser-beam to measure the distance from the apparatus to the object; pressing a record-button on the apparatus to record the at least one measured distance from the apparatus to the object; viewing the at least one measured distance on the digital-display.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a tape measure and recorder device, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a measuring apparatus and more particularly to a tape measure and recorder device as used to improve the accuracy and ease of measuring.

Generally, the present embodiment may include a laser added onto a tape measure front that can read a distance of where it 'hits'. Further, a digital interface may be included with some buttons for ease of use. The screen may be slightly inset with a frame around for protection. In addition, the screen may also be made from a scratch resistant material. With up/down arrow buttons a user may scroll between recorded measurements, a "del" button may allow the user to remove any measurements they wish, and a "Rec" button may record any measurement that is being currently displayed. The apparatus may include a solar panel on it to keep it charged all the time.

The apparatus may include a tape measure device that is self-retracting and includes a digital interface that utilizes a laser rangefinder in order to receive measurements that can be recorded. Recorded and current measurements taken can be viewed and deleted through the digital interface by the user. The recorder tape measure system may allow the user to digitally record measurements in order to provide an efficient tool that decreases safety hazards and increases productivity.

Referring now more specifically to the drawings by numerals of reference, there is shown in FIGS. 1-5, various views of an apparatus 100.

Figure 1:
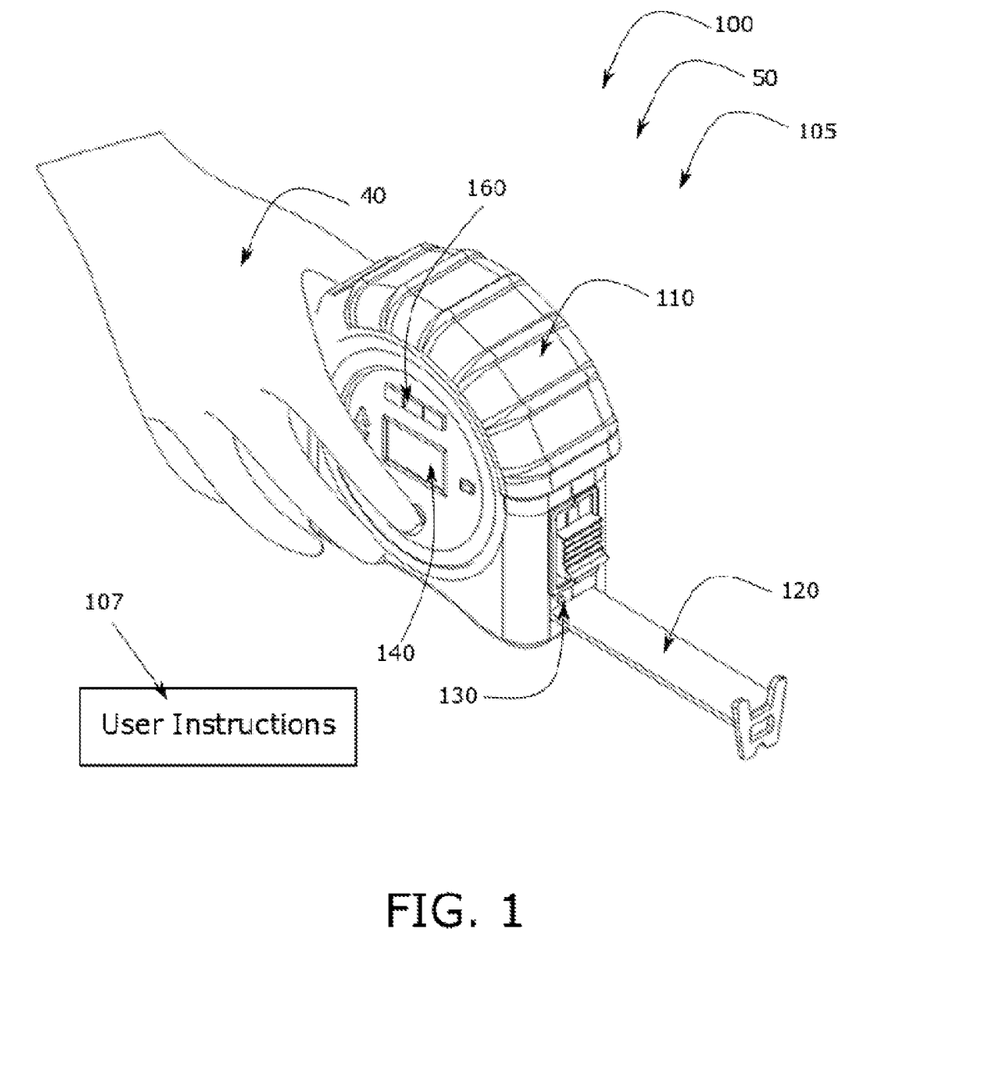
FIG. 1 is a side-front perspective view of the apparatus during an 'in-use' condition, according to an embodiment of the disclosure.

FIG. 1 shows an apparatus 100 during an 'in-use' condition 150, according to an embodiment of the present disclosure. The apparatus 100 may be used for measuring a distance from the apparatus 100 to an object. The apparatus 100 may include a housing 110, a retractable-tape 120, a laser-rangefinder 130, a controller 140 (FIG. 3), a digital-display 150, and a power-supply 160.

According to one embodiment, the apparatus 100 may be arranged as a kit 105. The kit 105 may include a set of user instructions 107. The instructions 107 may detail functional relationships in relation to the structure of the apparatus 100 (such that the apparatus 100 can be used, maintained, or the like, in a preferred manner).

Figure 2:
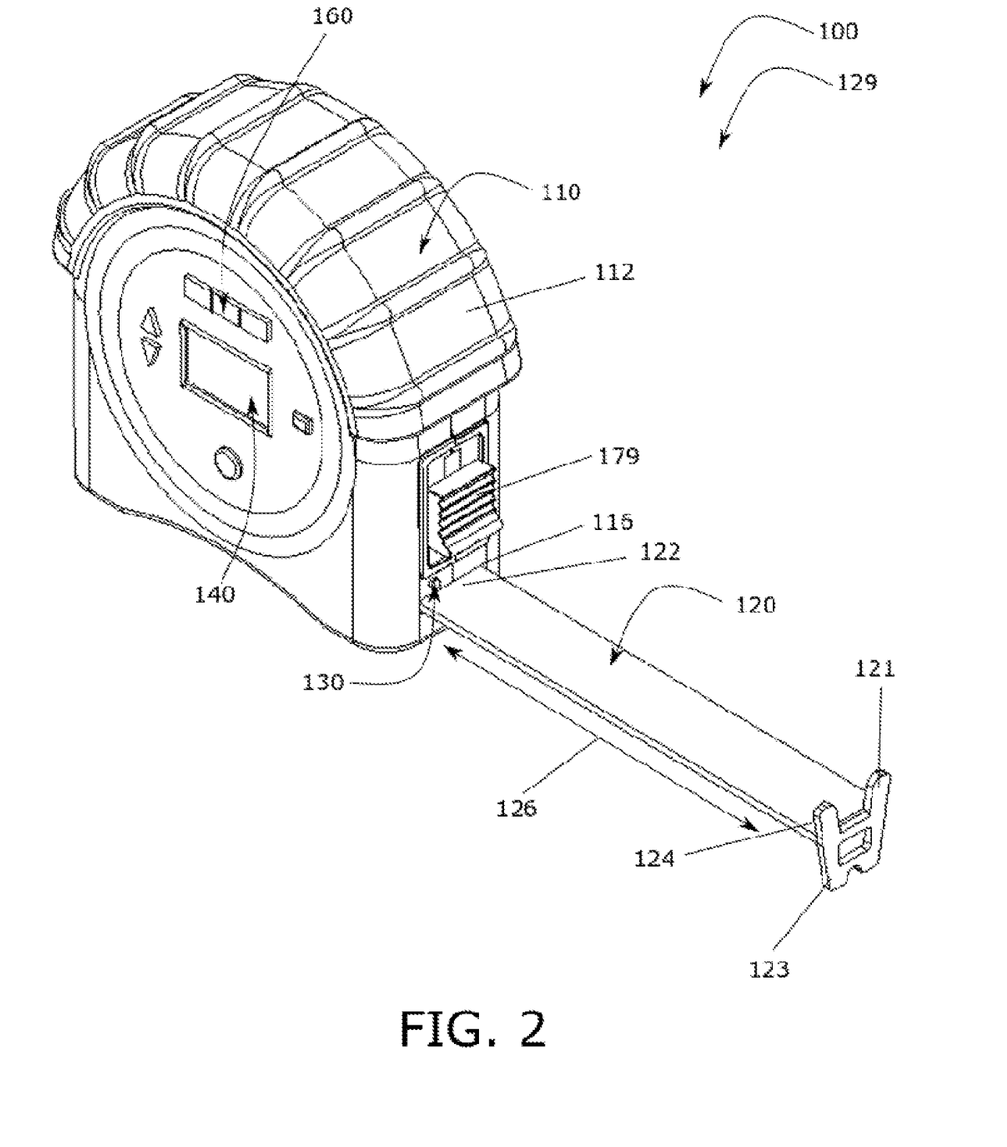
FIG. 2 is a side-front perspective view of the apparatus of FIG. 1, according to an embodiment of the present disclosure.

FIG. 2 shows a front perspective view of the apparatus 100 of FIG. 1, according to an embodiment of the present disclosure. As illustrated, the housing 110 may include an outer-surface 112, an inner-volume 114 (FIG. 3), and a tape-opening 116. Further, the housing 110 may include a lock 179 configured to selectively-lock the retractable-tape 120 in a plurality of positions.

The retractable-tape 120 may be disposed within the inner-volume 114 of the housing 110, and may include a first-end 122, a second-end 124, and a length 126 therebetween. The retractable-tape 120 may be configured to selectively move between a retracted-position 128 (FIG. 3) and an extended-position 129 via the tape-opening 116 of the housing 110. Further, the retractable-tape 120 may be sequentially wrapped about an axis such that it can be manipulated between the retracted-position 128 and the extended-position 129. The lock 179 located on the housing 110 may be configured to lock the retractable-tape 120 in the retracted-position 128, the extended-position 129, and in any position along the length 126 of the retractable-tape 120.

As shown, the second-end 124 of the retractable-tape 120 may include a raised-end 121, and the raised-end 121 may include a height greater than a height-location of the laser rangefinder on the housing 110. Further, the raised-end 121 include a bottom-lip 123 configured to rest upon the object when in the extended-position 129. In this embodiment, the distance from the apparatus 100 to the object may be measured from the first-end 122 of the apparatus 100 in the extended-position 129, to the bottom-lip 123 resting upon the object when in the extended-position 129.

Figure 3:
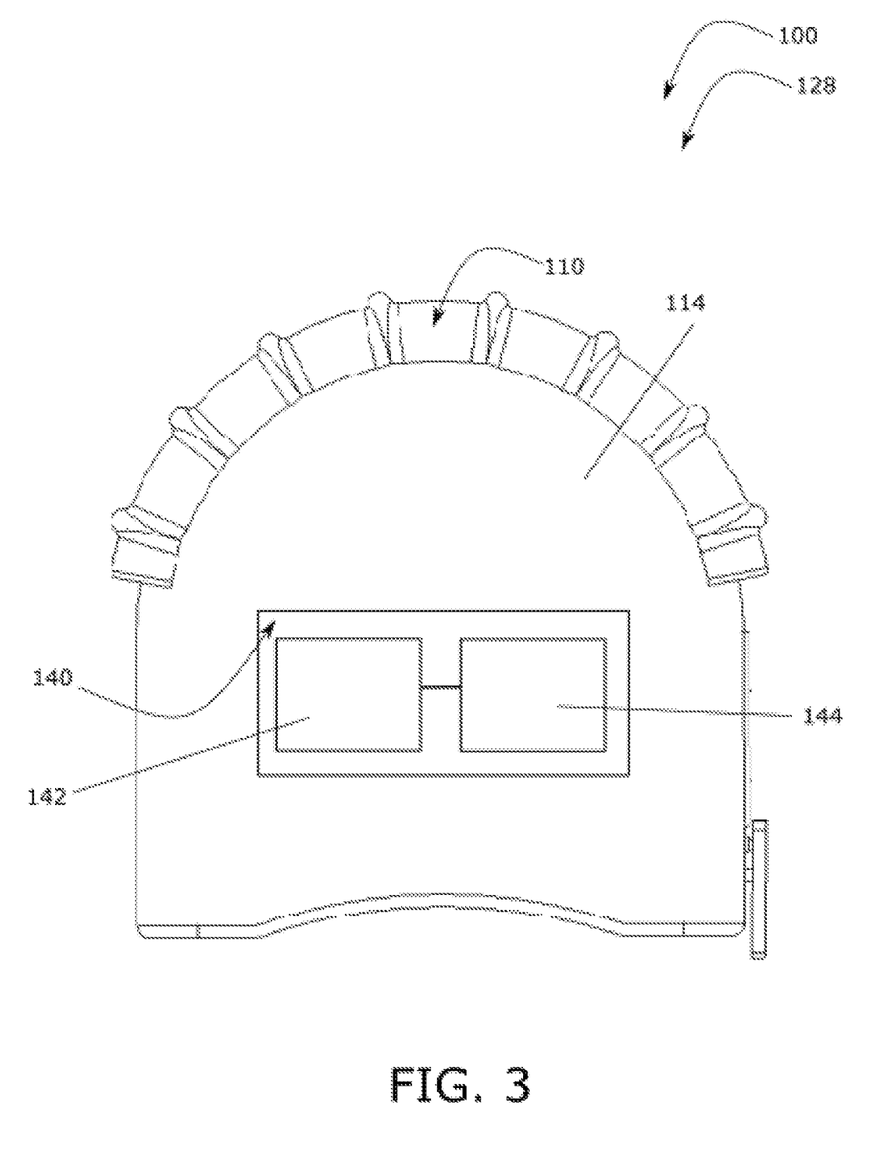
FIG. 3 is a front perspective view of the apparatus of FIG. 1, according to an embodiment of the present disclosure.

Referring now to FIG. 3 showing a front perspective view of the apparatus 100 of FIG. 1, according to an embodiment of the present disclosure. Illustrated is the controller 130 of the apparatus 100. The controller 140 may be disposed within the inner-volume 114 of the housing 110. As shown, the controller 140 may include a processor 142 configured to record at least one measured distance from the apparatus 100 to the object and a memory 144 configured to store the at least one measured distance from the apparatus 100 to the object. Further, the memory 144 may include a capacity configured to store a plurality of measured-distances.

Figure 4:
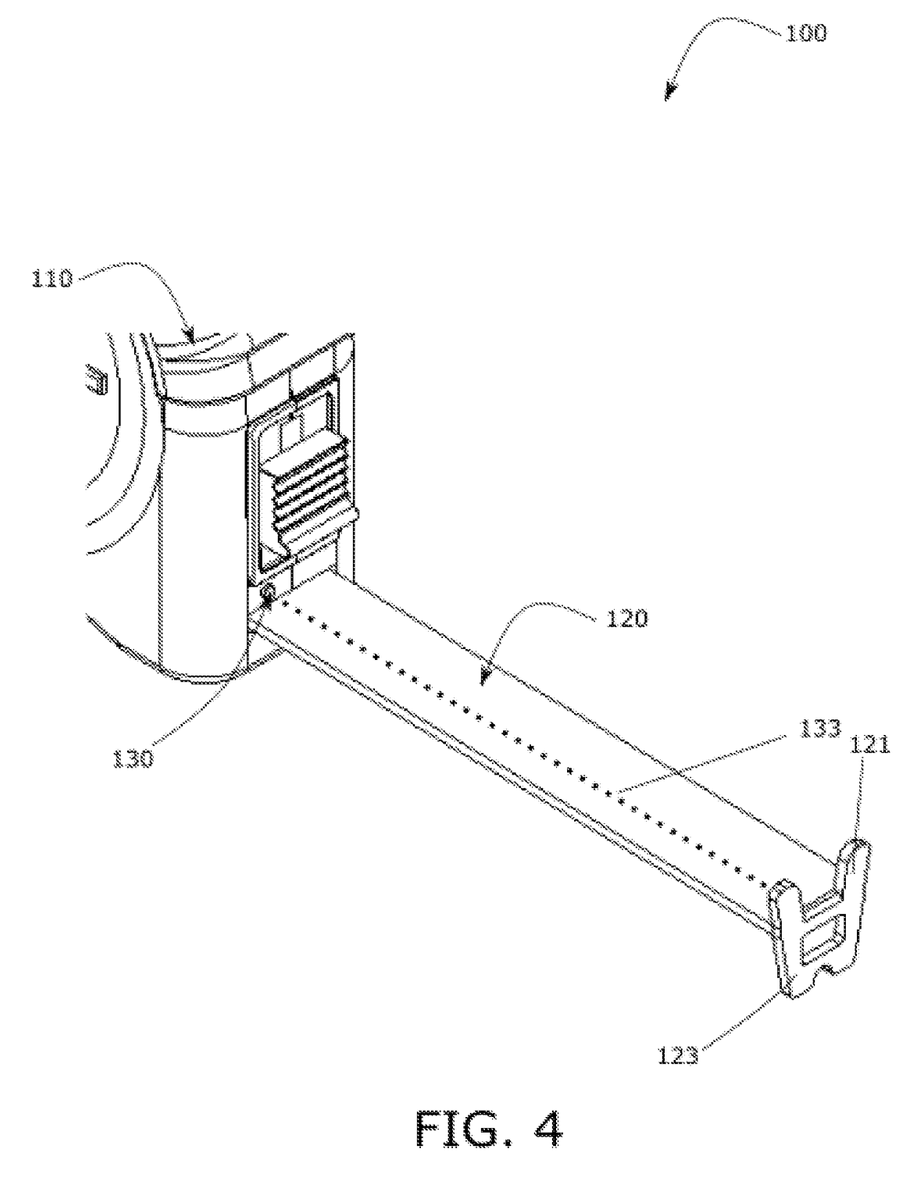
FIG. 4 is a side-front perspective view of the apparatus of FIG. 1, according to an embodiment of the present disclosure.

FIG. 4 shows a front perspective view of the apparatus 100 of FIG. 1, according to an embodiment of the present disclosure. Shown here is a close-up on the laser rangefinder 130 of the apparatus 100. The laser-rangefinder 130 may be located on the outer-surface 112 of the housing 110 and may include a laser-beam 133 configured to measure the distance from the apparatus 100 to the object. Further, as shown, the laser-rangefinder 130 may be located immediately above the tape-opening 116.

As above, the raised-end 121 of the second-end 124 may include the height greater than the height-location of the laser rangefinder on the housing 110. This may allow the laser-beam 133 to utilize the raised-end 121 as a point of reference to determine the distance from the apparatus 100 to the object (when the raised-end 121 is rested upon the object). The laser-rangefinder 130 may emit the laser-beam 133 in a narrow beam towards the object and measure the time taken by the pulse to be reflected off the raised-end 121 and returned to the apparatus 100. The laser-beam 133 may be automatically actuated when the retractable-tape 120 is in the extended-position 129, and further may be automatically terminated when the retractable-tape 120 is in the retracted-position 128.

Figure 5:
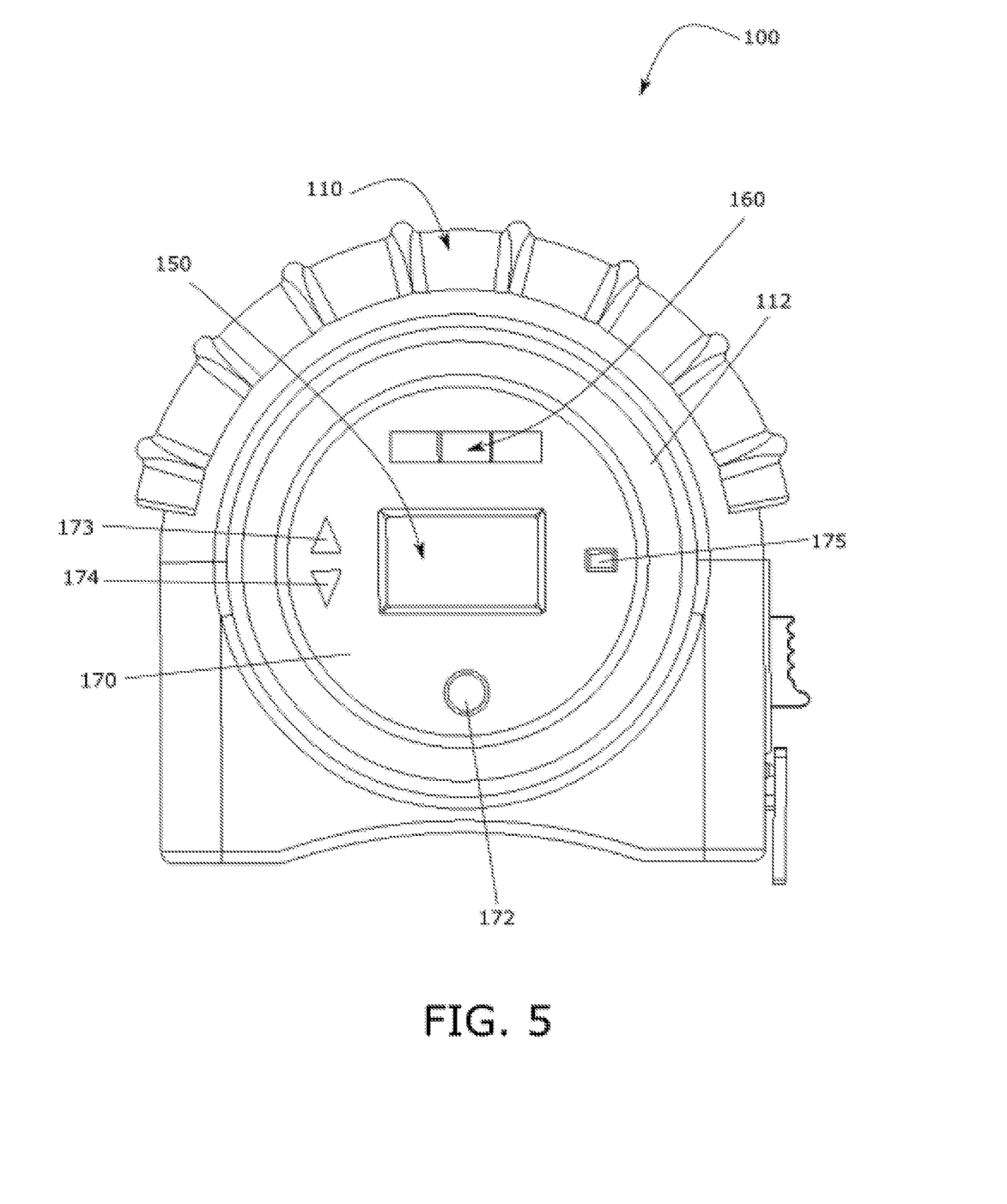
FIG. 5 is a side perspective view of the apparatus of FIG. 1, according to an embodiment of the present disclosure.

FIG. 5 shows a front perspective view of the apparatus 100 of FIG. 1, according to an embodiment of the present disclosure. Shown here is the digital-display 150, the power supply 160, and a user-interface 170 of the apparatus 100. The digital-display 150 may be located on the outer-surface 112 of the housing 110 and communicably coupled to the controller 140, the digital-display 150 being configured to display the at least one measured distance from the apparatus 100 to the object.

As illustrated, the outer-surface 112 may further include the user-interface 170 communicably coupled to the controller 140 and the digital-display 150. The user-interface 170 may include a record-button 172 configured to actuate the processor 142 to record the at least one measured distance from the apparatus 100 to the object. Further, the user-interface 170 may further include an up-button 173 and a down-button 174. As above, the memory 144 (FIG. 3) may include the capacity configured to store the plurality of measured-distances and the plurality of measured-distances may be displayed as a list on the digital-display 150. Thus, in this embodiment, the up-button 173 and the down-button 174 may be configured for selectively scrolling through the list. In addition to this, the user-interface 170 may further include a delete button 175 configured to delete at least one of the plurality of measured-distances.

The power-supply 160 may be configured to provide power to the controller 140, the laser-rangefinder 130 and the digital-display 150. In a preferred embodiment, the power-supply 160 may be a solar-panel 177 located on the outer-surface 112 of the housing 110.

Figure 6:
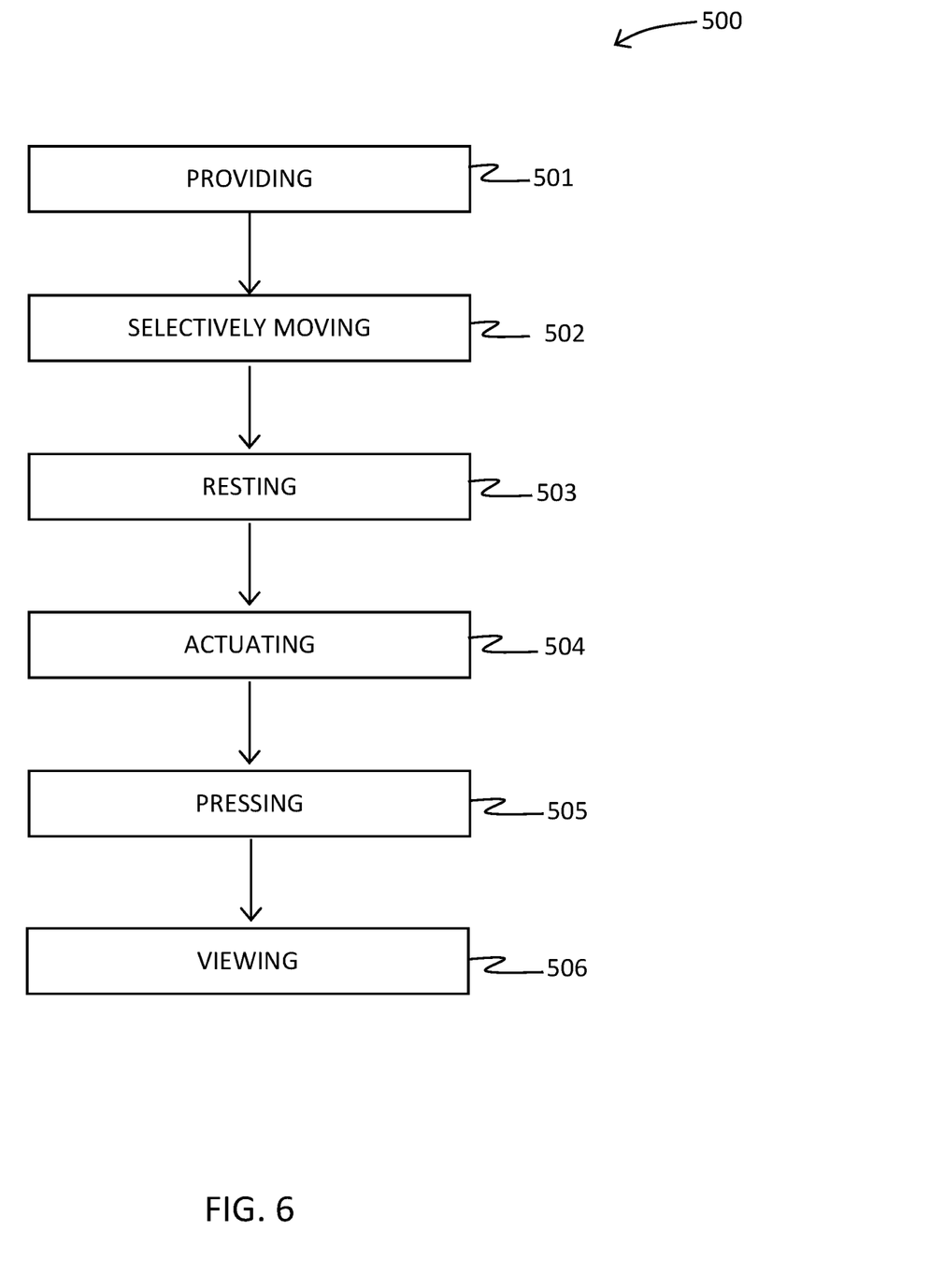
FIG. 6 is a flow diagram illustrating a method of use for apparatus, according to an embodiment of the present disclosure.

FIG. 6 is a flow diagram illustrating a method of using 500 an apparatus 100 for measuring a distance from the apparatus to an object, according to an embodiment of the present disclosure. As illustrated, the method of using 500 an apparatus 100 for measuring a distance from the apparatus to an object may include the steps of: step one 501, a providing the apparatus 100 as above; step two 502, selectively moving the retractable-tape 120 from the retracted-position 128 to the extended-position 129; step three 503, resting the second-end 124 of the retractable-tape 120 on the object; step four 504, actuating the laser-beam 133 to measure the distance from the apparatus 100 to the object; step five 505, pressing a record-button 172 on the apparatus 100 to record the at least one measured distance from the apparatus 100 to the object; and step six 506, viewing the at least one measured distance on the digital-display 150.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using apparatus 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparatus for measuring a distance from the apparatus to an object, the apparatus comprising:

a housing including an outer-surface, an inner-volume, and a tape-opening;

a retractable-tape disposed within the inner-volume of the housing, the retractable-tape including a first-end, a second-end, and a length therebetween, and wherein the retractable-tape is configured to selectively move between a retracted-position and an extended-position via the tape-opening of the housing;

a laser-rangefinder located on the outer-surface of the housing, the laser-rangefinder including a laser-beam configured to measure the distance from the apparatus to the object;

a controller disposed within the inner-volume of the housing, the controller including:

a processor configured to record at least one measured distance from the apparatus to the object; and         a memory configured to store the at least one measured distance from the apparatus to the object;

a digital-display located on the outer-surface of the housing and communicably coupled to the controller, the digital-display being configured to display the at least one measured distance from the apparatus to the object; and     a power-supply configured to provide power to the controller, the laser-rangefinder and the digital-display.

2. The apparatus of claim 1, wherein the retractable-tape is sequentially wrapped about an axis such that it can be manipulated between the retracted-position and the extended-position.

3. The apparatus of claim 1, wherein the laser-rangefinder is located immediately above the tape-opening.

4. The apparatus of claim 1, wherein the second-end of the retractable-tape includes a raised-end; and     wherein the raised-end includes a height greater than a height-location of the laser rangefinder on the housing.

5. The apparatus of claim 4, wherein the raised-end include a bottom-lip configured to rest upon the object when in the extended-position.

6. The apparatus of claim 5, wherein the distance from the apparatus to the object is measured from the first-end of the apparatus in the extended-position, to the bottom-lip resting upon the object when in the extended-position.

7. The apparatus of claim 6, wherein the laser-beam is automatically actuated when the retractable-tape is in the extended-position.

8. The apparatus of claim 7, wherein the laser-beam is automatically terminated when the retractable-tape is in the retracted-position.

9. The apparatus of claim 1, wherein the outer-surface further includes a user-interface communicably coupled to the controller and the digital-display.

10. The apparatus of claim 9, wherein the user-interface includes a record-button configured to actuate the processor to record the at least one measured distance from the apparatus to the object.

11. The apparatus of claim 10, wherein the user-interface further includes an up-button and a down-button.

12. The apparatus of claim 1, wherein the memory includes a capacity configured to store a plurality of measured-distances.

13. The apparatus of claim 12, wherein the plurality of measured-distances are displayed as a list on the digital-display.

14. The apparatus of claim 13, wherein the up-button and the down-button are configured for selectively scrolling through the list.

15. The apparatus of claim 14, wherein the user-interface further includes a delete button configured to delete at least one of the plurality of measured-distances.

16. The apparatus of claim 1, wherein the power-supply is a solar-panel located on the outer-surface of the housing.

17. The apparatus of claim 1, wherein the housing further includes a lock configured to selectively-lock the retractable-tape in a plurality of positions.

18. An apparatus for measuring a distance from the apparatus to an object, the apparatus comprising:
   a housing including an outer-surface, an inner-volume, and a tape-opening;
   a retractable-tape disposed within the inner-volume of the housing, the retractable-tape including a first-end, a second-end, and a length therebetween, and wherein the retractable-tape is configured to selectively move between a retracted-position and an extended-position via the tape-opening of the housing;
   a laser-rangefinder located on the outer-surface of the housing, the laser-rangefinder including a laser-beam configured to measure the distance from the apparatus to the object;
   a controller disposed within the inner-volume of the housing, the controller including:
      a processor configured to record at least one measured distance from the apparatus to the object; and
      a memory configured to store the at least one measured distance from the apparatus to the object;
      a digital-display located on the outer-surface of the housing and communicably coupled to the controller, the digital-display being configured to display the at least one measured distance from the apparatus to the object; and
   a power-supply configured to provide power to the controller, the laser-rangefinder and the digital-display; and
   wherein the retractable-tape is sequentially wrapped about an axis such that it can be manipulated between the retracted-position and the extended-position;
   wherein the laser-rangefinder is located immediately above the tape-opening;
   wherein the second-end of the retractable-tape includes a raised-end;
   wherein the raised-end includes a height greater than a height-location of the laser rangefinder on the housing;
   wherein the raised-end include a bottom-lip configured to rest upon the object when in the extended-position;
   wherein the raised-end include a bottom-lip configured to rest upon the object when in the extended-position;
   wherein the laser-beam is automatically actuated when the retractable-tape is in the extended-position;
   wherein the laser-beam is automatically terminated when the retractable-tape is in the retracted-position;
   wherein the outer-surface further includes a user-interface communicably coupled to the controller and the digital-display;
   wherein the user-interface includes a record-button configured to actuate the processor to record the at least one measured distance from the apparatus to the object;
   wherein the user-interface further includes an up-button and a down-button;
   wherein the memory includes a capacity configured to store a plurality of measured-distances;
   wherein the plurality of measured-distances are displayed as a list on the digital-display;
   wherein the up-button and the down-button are configured for selectively scrolling through the list;
   wherein the user-interface further includes a delete button configured to delete at least one of the plurality of measured-distances;
   wherein the power-supply is a solar-panel located on the outer-surface of the housing; and
   wherein the housing further includes a lock configured to selectively-lock the retractable-tape in a plurality of positions.

19. The apparatus of claim 17, further comprising set of instructions; and
   wherein the apparatus is arranged as a kit.

20. A method of using an apparatus for measuring a distance from the apparatus to an object, the method comprising the steps of:
   providing the apparatus for measuring the distance from the apparatus to the object, the apparatus including:
      a housing including an outer-surface, an inner-volume, and a tape-opening;
      a retractable-tape disposed within the inner-volume of the housing, the retractable-tape including a first-end, a second-end, and a length therebetween, and wherein the retractable-tape is configured to selectively move between a retracted-position and an extended-position via the tape-opening of the housing;
      a laser-rangefinder located on the outer-surface of the housing, the laser-rangefinder including a laser-beam configured to measure the distance from the apparatus to the object;
      a controller disposed within the inner-volume of the housing, the controller including:
         a processor configured to record at least one measured distance from the apparatus to the object; and
         a memory configured to store the at least one measured distance from the apparatus to the object;
      a digital-display located on the outer-surface of the housing and communicably coupled to the controller, the digital-display being configured to display the at least one measured distance from the apparatus to the object; and
      a power-supply configured to provide power to the controller, the laser-rangefinder and the digital-display;
   selectively moving the retractable-tape from the retracted-position to the extended-position;
   resting the second-end of the retractable-tape on the object;
   actuating the laser-beam to measure the distance from the apparatus to the object;
   pressing a record-button on the apparatus to record the at least one measured distance from the apparatus to the object; and
   viewing the at least one measured distance on the digital-display.

* * * * *